(12) United States Patent
Devarakonda

(10) Patent No.: US 12,340,231 B2
(45) Date of Patent: Jun. 24, 2025

(54) METHOD FOR CRITERIA-BASED DESIRED STATE MANAGEMENT

(71) Applicant: VMware, Inc., Palo Alto, CA (US)

(72) Inventor: Kalyan Devarakonda, Bangalore (IN)

(73) Assignee: VMware LLC, Palo Alto, CA (US)

( * ) Notice: Subject to any disclaimer, the term of this patent is extended or adjusted under 35 U.S.C. 154(b) by 94 days.

(21) Appl. No.: 18/295,759

(22) Filed: Apr. 4, 2023

(65) Prior Publication Data

US 2024/0338225 A1 Oct. 10, 2024

(51) Int. Cl.
*G06F 9/445* (2018.01)
*G06F 9/455* (2018.01)

(52) U.S. Cl.
CPC ...... *G06F 9/44505* (2013.01); *G06F 9/45558* (2013.01); *G06F 2009/45595* (2013.01)

(58) Field of Classification Search
CPC .......................... G06F 9/44505; G06F 9/45558
USPC ......................................................... 713/100
See application file for complete search history.

(56) References Cited

U.S. PATENT DOCUMENTS

| | | | | |
|---|---|---|---|---|
| 8,095,488 B1* | 1/2012 | Satish | ................ | G06N 7/01 706/20 |
| 9,582,328 B1* | 2/2017 | Tao | ................ | G06F 9/5072 |
| 10,394,793 B1* | 8/2019 | Todd | ................ | H04L 67/10 |
| 10,838,712 B1* | 11/2020 | Mukhopadhyay | ........ | G06F 8/61 |
| 11,848,833 B1* | 12/2023 | Govindaraju | ........... | H04L 43/04 |
| 2006/0184936 A1* | 8/2006 | Abels | ................ | G06F 9/5077 718/1 |
| 2016/0191463 A1* | 6/2016 | Mohanty | ............ | H04L 63/0227 726/11 |
| 2016/0371396 A1* | 12/2016 | Todd | ................ | H04L 9/3247 |
| 2017/0317928 A1* | 11/2017 | Gude | ................ | H04L 45/72 |
| 2017/0317979 A1* | 11/2017 | Bansal | ................ | H04L 63/0236 |
| 2018/0124112 A1* | 5/2018 | Sevinc | ................ | G06F 9/45558 |
| 2019/0012211 A1* | 1/2019 | Selvaraj | ................ | G06F 9/5072 |
| 2019/0026175 A1* | 1/2019 | Shelke | ................ | G06F 11/0775 |
| 2019/0028345 A1* | 1/2019 | Kommula | ........... | H04L 41/0816 |
| 2019/0058752 A1* | 2/2019 | Panse | ................ | H04L 67/06 |
| 2019/0220208 A1* | 7/2019 | Shi | ................ | G06F 3/0614 |
| 2019/0379576 A1* | 12/2019 | Narnakaje Venugopala | ............... | H04L 41/142 |
| 2020/0012505 A1* | 1/2020 | Shil | ................ | H04L 67/10 |
| 2020/0244549 A1* | 7/2020 | Finch | ................ | H04L 67/53 |
| 2020/0295951 A1* | 9/2020 | Kottapalli | ........... | H04L 63/0823 |
| 2020/0334060 A1* | 10/2020 | Pierscieniak | ......... | G06F 11/302 |
| 2020/0382324 A1* | 12/2020 | Pierscieniak | ......... | H04L 9/3268 |
| 2021/0004293 A1* | 1/2021 | Shah | ................ | G06F 11/1448 |
| 2023/0109215 A1* | 4/2023 | Petrov | ................ | G06F 16/2282 717/121 |

(Continued)

*Primary Examiner* — Paul R. Myers
(74) *Attorney, Agent, or Firm* — Kim & Stewart LLP

(57) ABSTRACT

A method of managing a desired state of a software-defined data center (SDDC) includes the steps of: receiving an original desired state document that includes configurations and associated criteria for applying the configurations; evaluating a first criteria to determine that a first configuration associated with the first criteria is applicable to components of the SDDC; evaluating a second criteria to determine that a second configuration associated with the second criteria is not applicable to any components of the SDDC; creating an updated desired state of the SDDC, as a result of the evaluating of the first and second criteria, the updated desired state including the first configuration and excluding the second configuration; and applying the updated desired state to the SDDC.

12 Claims, 11 Drawing Sheets

(56) References Cited

U.S. PATENT DOCUMENTS

| | | | | |
|---|---|---|---|---|
| 2023/0176917 A1* | 6/2023 | Lal | .......................... | H04L 63/20 |
| | | | | 718/105 |
| 2023/0185627 A1* | 6/2023 | Gupta | ..................... | G06F 9/485 |
| | | | | 718/1 |
| 2023/0188418 A1* | 6/2023 | Raj | ..................... | H04L 67/1095 |
| | | | | 709/220 |
| 2023/0275850 A1* | 8/2023 | Seibel | ................... | H04L 63/105 |
| | | | | 709/226 |
| 2023/0315486 A1* | 10/2023 | Devarakonda | ....... | G06F 9/44505 |

* cited by examiner

Figure 4B

METHOD FOR CRITERIA-BASED DESIRED STATE MANAGEMENT

BACKGROUND

In a software-defined data center (SDDC), virtual infrastructure (VI), which includes virtual machines (VMs) and virtualized storage and networking resources, is provisioned from hardware infrastructure. The hardware infrastructure includes a plurality of host computers, referred to herein simply as hosts, and includes storage devices and networking devices. The provisioning of the VI is carried out by SDDC management software that is deployed on management appliances such as a VMware vCenter Server® appliance and a VMware NSX® appliance, available from VMware, Inc. The SDDC management software manages the VI by communicating with virtualization software (e.g., a hypervisor) installed in the hosts.

It has become common to deploy multiple SDDCs across multiple clusters of hosts. Each cluster is a group of hosts that are managed together by the management software to provide cluster-level functions. For example, such functions include load balancing across the cluster through VM migration between the hosts, distributed power management, dynamic VM placement according to affinity and anti-affinity rules, and high availability (HA). The management software also manages shared storage devices to provision storage resources for the clusters from the shared storage devices. The management software also manages software-defined networks through which the VMs communicate with each other.

For some organizations, their SDDCs are deployed across different geographical regions and may even be deployed in a hybrid manner. A hybrid cloud is one in which applications are running in a combination of different environments, e.g., on-premise, in a private cloud, in a public cloud, and/or as a service. SDDCs that are deployed on-premise are provisioned in a private data center that is controlled by a particular organization. SDDCs that are deployed in a public cloud are provisioned in a public data center along with SDDCs of other organizations. SDDCs that are deployed as a service are provided to the particular organization as a service on a subscription basis such that management operations such as configuring, upgrading, and patching are performed for the particular organization according to a service-level agreement (SLA).

With a large number of SDDCs, monitoring and performing operations on the SDDCs and managing the lifecycle of management software have proven to be challenging. Conventional techniques for managing the SDDCs and the management software of the SDDCs are not practicable when there is a large number of SDDCs, especially when they are spread out across multiple geographical locations and in a hybrid manner. The desired state of each SDDC, which includes configurations of services running in management appliances of the SDDC, may be defined in a declarative document, referred to herein as a desired state document. The SDDCs are then deployed or updated according to respective desired states defined in respective desired state documents. However, the creation and usage of such desired states has proven to be complex and unscalable.

For example, conventional techniques for creating the desired states have required organizations to spend substantial time determining and specifying configurations. Determining configurations has required manually identifying optimal values for attributes of various SDDCs. Specifying configurations has required making application programming interface (API) calls that specify the configurations, inputting the configurations via user interfaces (UIs), or creating files such as JavaScript Object Notation (JSON) files that include the configurations. Additionally, once the configurations have been determined and specified and desired state documents for each of the SDDCs have been created, managing and applying the desired states has been difficult.

Each desired state document may have hundreds of thousands of lines of code, the amount of code increasing with the number of different SDDC components to configure. For example, a single SDDC may have thousands of hosts, the respective desired configuration document including configurations for each of the hosts. It is thus unwieldy to manage such desired state documents, which require changes over time to account for changing needs for SDDCs. Furthermore, applying a desired state to an associated SDDC requires first downloading the desired state document from a cloud platform that maintains the desired state document to the physical location in which the SDDC is provisioned. Such downloading is increasingly slow as the sizes of desired state documents increase. A simpler and more scalable method for managing desired states of SDDCs is desired.

SUMMARY

One or more embodiments provide a method of managing a desired state of an SDDC. The method includes the steps of: receiving an original desired state document that includes configurations and associated criteria for applying the configurations; evaluating a first criteria to determine that a first configuration associated with the first criteria is applicable to components of the SDDC; evaluating a second criteria to determine that a second configuration associated with the second criteria is not applicable to any components of the SDDC; creating an updated desired state of the SDDC, as a result of the evaluating of the first and second criteria, the updated desired state including the first configuration and excluding the second configuration; and applying the updated desired state to the SDDC.

Further embodiments include a non-transitory computer-readable storage medium comprising instructions that cause a computer system to carry out the above method, as well as a computer system configured to carry out the above method.

BRIEF DESCRIPTION OF THE DRAWINGS

FIG. 4B is a block diagram illustrating an example of using the UI to specify management appliance setting configurations to be added to the desired state document.

DETAILED DESCRIPTION

Figure 1:
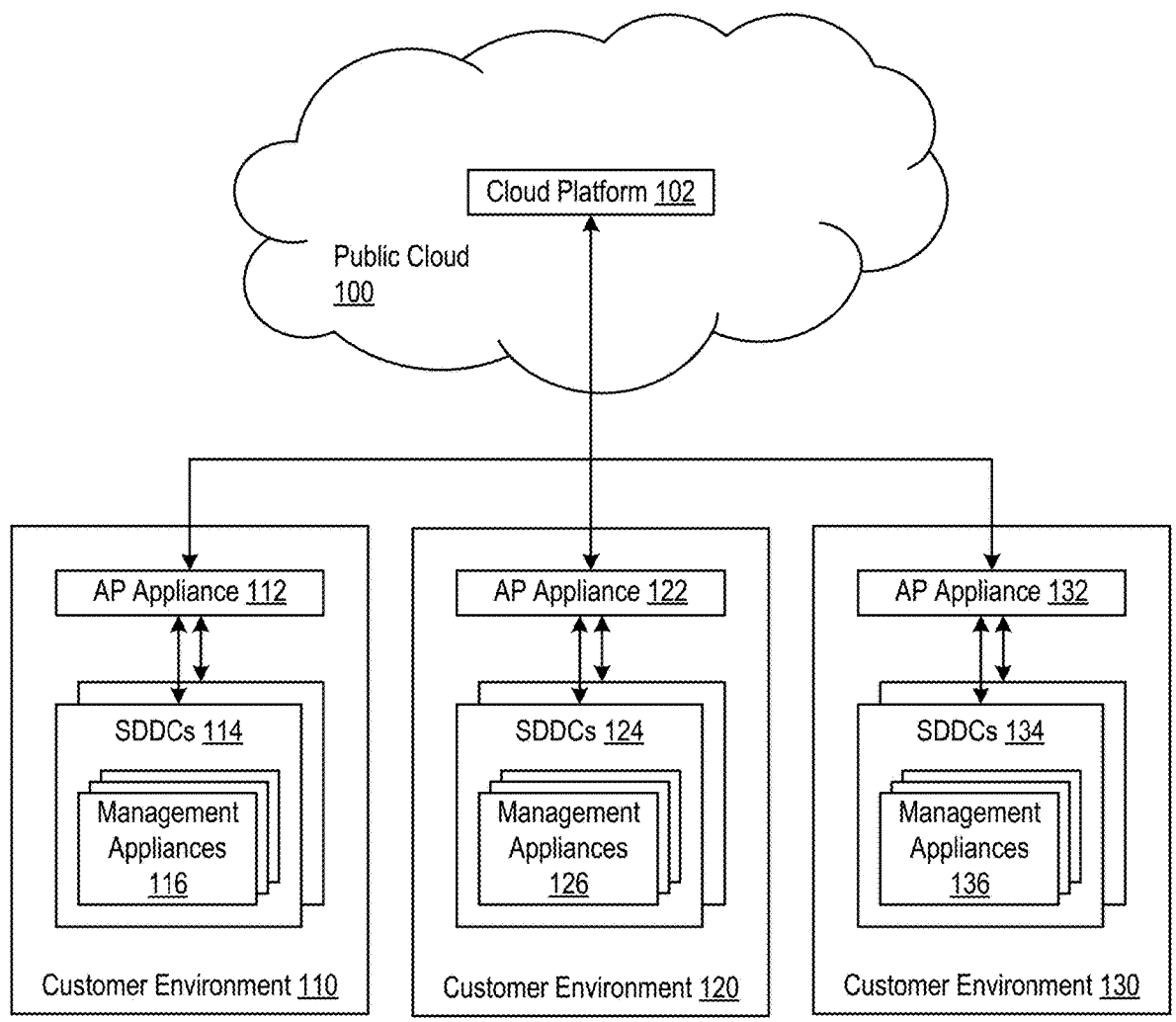
FIG. 1 is a block diagram of customer environments of different organizations that are managed through a multi-tenant cloud platform implemented in a public cloud.

Techniques for managing desired state documents of SDDCs are described. According to embodiments, a cloud platform delivers various services to the SDDCs through agents that are running in an appliance. The services of the cloud platform are referred to herein as "cloud services," and the appliance in which the agents are running is referred to herein as an "agent platform (AP) appliance." The cloud platform is provisioned in a public cloud, and the AP appliance is deployed in a customer environment along with management appliances of the SDDCs. Each of the cloud services has a corresponding agent deployed on the AP appliance that the cloud service communicates with, the cloud platform and AP appliance being connected to each other over a public network such as the Internet. Furthermore, the AP appliance and management appliances are connected to each other over a private network of the customer environment such as a local area network (LAN). Accordingly, the cloud services and management appliances are able to communicate through the agents of the AP appliance.

The desired states of SDDCs of a particular organization are managed by a cloud service referred to herein as a configuration service. Once the organization creates a desired state, the configuration service uses configurations from that desired state to deploy or update one or more SDDCs. According to embodiments, the organization creates the desired state through a UI that categorizes options for configurations. Furthermore, within categories, predefined configurations are presented, e.g., based on industry standards. The organization thus adds or selects configurations seamlessly through an organized UI. Furthermore, for configurations that the organization adds or selects, the UI presents options for specifying how those configurations are applied through the use of criteria.

For example, using criteria, the organization, specifies which SDDCs to apply various configurations to. Accordingly, the organization may create a single desired state that is applicable to all of the organization's SDDCs, some of the configurations therein being applicable to some SDDCs and other configurations being applicable to others. Alternatively, the organization may create one desired state that is applicable to some SDDCs and another desired state that is applicable to others. Additionally, by using criteria, the organization specifies which components within SDDCs to apply various configurations to. For example, some configurations may be applicable to all hosts, while other configurations are only applicable to hosts that have a particular tag applied thereto.

After creating one or more desired states, the organization identifies SDDCs to deploy or update according to the desired states. Desired state documents are then downloaded to the organization's customer environment. Components of the customer environment, referred to herein as criteria orchestrators, analyze the criteria to determine how to apply configurations to respective SDDCs. Based on the analysis, the criteria orchestrators create local desired state documents for each of the SDDCs. The local desired state documents include only those configurations that are applicable to respective SDDCs. The management appliances then deploy or update the SDDCs according to the local desired state documents.

By using criteria, organizations create desired state documents that are manageable at scale. For example, if there is a configuration that is applicable to thousands of hosts, the desired state document simply includes a single copy of that configuration, along with criteria that indicates that the configuration is applicable to those hosts. Organizations thus dramatically reduce the sizes of desired state documents, which makes such desired state documents simpler to manage and faster to download and apply. These and further aspects of the invention are discussed below with respect to the drawings.

FIG. 1 is a block diagram of customer environments 110, 120, and 130 of different organizations (also referred to as "customers"). The customer environments are managed through a multi-tenant cloud platform 102 implemented in a public cloud 100. A plurality of SDDCs is illustrated in each of the customer environments, including SDDCs 114 in customer environment 110, SDDCs 124 in customer environment 120, and SDDCs 134 in customer environment 130. As used herein, a "customer environment" means one or more on-premise data centers managed by the customer, a private cloud managed by the customer, a public cloud managed for the customer by another organization, or any combination of these. In addition, the SDDCs of any customer may be deployed in a hybrid manner, e.g., on-premise, in a public cloud, and/or as a service, and across different geographical regions.

In each customer environment, the SDDCs are managed by respective management appliances, including management appliances 116 of SDDCs 114, management appliances 126 of SDDCs 124, and management appliances 136 of SDDCs 134. The management appliances of each of the customer environments include a VM management appliance (e.g., a VMware vCenter Server® appliance, available from VMware, Inc.) for overall management of VI. The management appliances of each of the customer environments further include a network management appliance (e.g., a VMware NSX® appliance, available from VMware, Inc.) for management of virtual networks.

The management appliances in each of the customer environments communicate with a respective AP appliance, including an AP appliance 112 in customer environment 110, an AP appliance 122 in customer environment 120, and an AP appliance 132 in customer environment 130. Agents (not shown in FIG. 1) are installed on each of the AP appliances, and the agents communicate with cloud platform 102 to deliver cloud services to respective customer environments. In some embodiments, each of the AP appliances and each of the management appliances are a VM instantiated on one or more physical hosts. In other embodiments, any of the AP appliances and the management appliances may be implemented as physical hosts.

Figure 2:
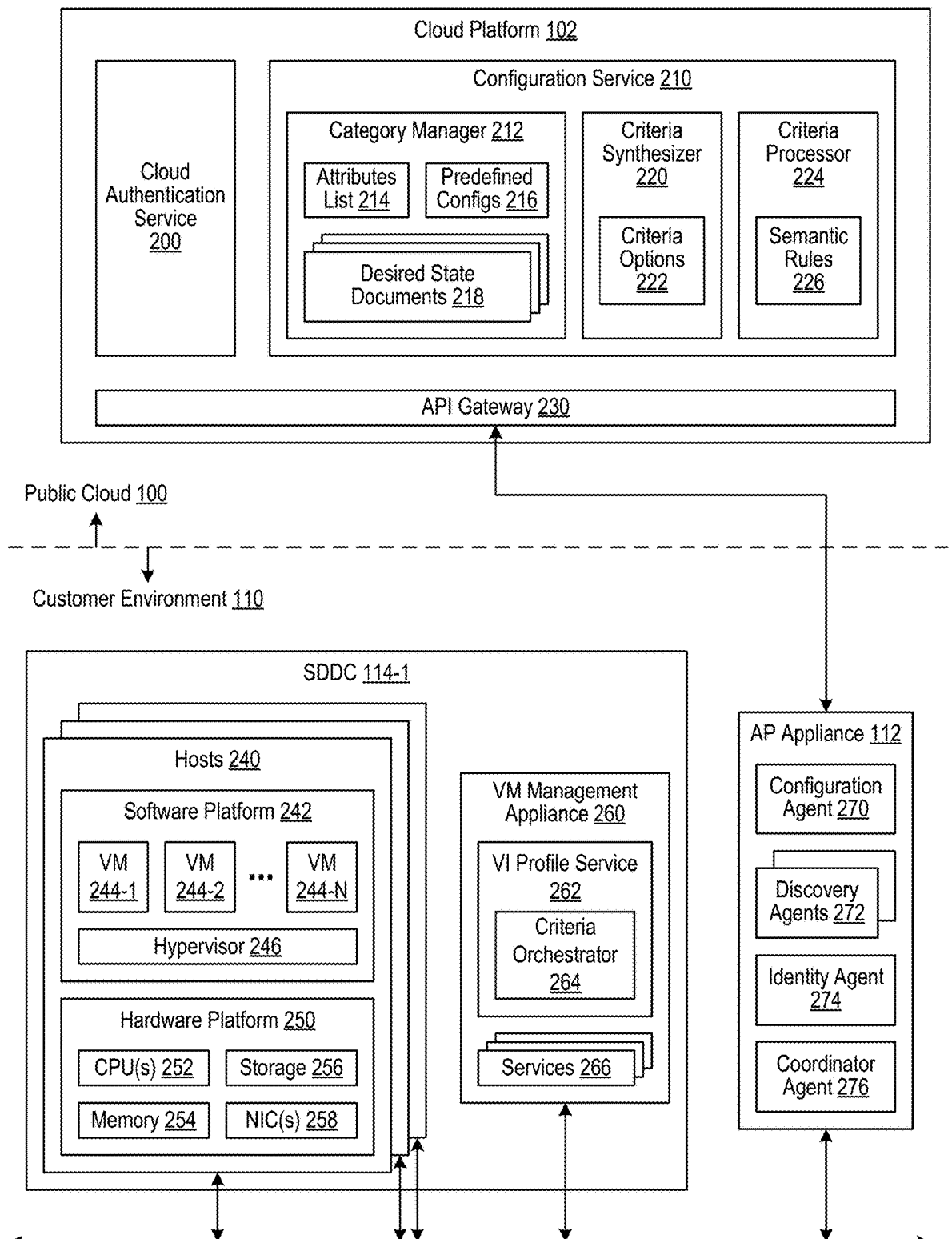
FIG. 2 is a block diagram of the public cloud and a single customer environment, according to a first embodiment.

FIG. 2 is a block diagram of public cloud 100 and customer environment 110, according to a first embodiment. Customer environment 110 includes an SDDC 114-1, which includes a plurality of hosts 240 and a VM management appliance 260 (one of management appliances 116). Each of hosts 240 is constructed on a hardware platform 250 such as an x86 architecture platform. Hardware platform 250 includes conventional components of a computing device, such as one or more central processing units (CPUs) 252, memory 254 such as random-access memory (RAM), storage 256 such as one or more magnetic drives or solid-state drives (SSDs) and/or a host bus adapter for connecting to a storage area network, and one or more network interface cards (NICs) 258.

CPU(s) 252 are configured to execute instructions such as executable instructions that perform one or more operations described herein, which may be stored in memory 254. NIC(s) 258 enable hosts 240 to communicate with each other and with other devices over a network 202. Network 202 is distinguishable from a public network such as the Internet through which cloud platform 102 communicates with devices of customer environment 110. Network 202 is a private network, e.g., a LAN or a sub-net, and is partitioned from the public network through a firewall.

Hardware platform 250 of each of hosts 240 supports a software platform 242. Software platform 242 includes a hypervisor 246, which is a virtualization software layer. Hypervisor 246 supports a VM execution space within which VMs 244 are concurrently instantiated and executed. One example of hypervisor 246 is a VMware ESX® hypervisor, available from VMware, Inc.

VM management appliance 260 logically groups hosts 240 into one or more clusters to perform cluster-level tasks such as provisioning and managing VMs 244 and migrating VMs 244 from one of hosts 240 to another. VM management appliance 260 communicates with hosts 240 via a management network (not shown) provisioned from network 202. In embodiments described herein, VM management appliance 260 is one of hosts 240 or one of VMs 244. However, in other embodiments, VM management appliance 260 may be implemented via other types of virtual computing instances such as containers, Docker® containers, data compute nodes, and isolated user space instances.

VM management appliance 260 includes a VI profile service 262 and various other services 266. VI profile service 262 provides various functionalities for managing the desired state of SDDC 114-1 such as getting the current state of SDDC 114-1 and applying a desired state document. According to the first embodiment, VI profile service 262 includes a criteria orchestrator component 264, which analyzes a desired state document to determine, based on criteria, which configurations are applicable to SDDC 114-1 and to which components thereof. VM management appliance 260 issues role-based authentication tokens such as Security Assertions Markup Language (SAML) tokens. Each authentication token allows a party possessing the token to access VM management appliance 260 to perform operations that are associated with the issued token. VM management appliance 260 is discussed further below in conjunction with FIG. 3.

Public cloud 100 is operated by a cloud computing service provider from a plurality of physical hosts (not shown). Cloud platform 102 includes a cloud authentication service 200, a configuration service 210, and other cloud services (not shown). Such other cloud services include an upgrade service, a monitoring service, etc. In one embodiment, each of the cloud services of cloud platform 102 is a microservice that is implemented as one or more container images executed on VI of public cloud 100. Devices of customer environment 110 communicate with the cloud services by making API calls such as Java API calls via an API gateway 230.

Cloud authentication service 200 enables authentication with configuration service 210 and the other cloud services. To enable such authentication, cloud authentication service 200 issues access tokens such as JavaScript Object Notation (JSON) web tokens (JWTs). Each access token allows a requesting party to communicate with a cloud service via API gateway 230. It should be noted that although cloud authentication service 200 is illustrated as being within cloud platform 102, cloud authentication service 200 may run on a virtual or physical server that is not part of cloud platform 102 but that is accessible to cloud platform 102.

Configuration service 210 manages desired states of SDDCs for the customer of customer environment 110. Configuration service 210 includes a category manager component 212, a criteria synthesizer component 220, and a criteria processor component 224. Category manager 212 stores an attributes list 214, which is a list of attributes that may be configured for an SDDC. The attributes of attributes list 214 are grouped into categories. Category manager 212 also stores predefined configurations 216, which include values for various attributes of attributes list 214, e.g., based on industry standards. Category manager 212 also stores desired state documents 218, which define all the desired states that the customer has created.

Criteria synthesizer 220 stores criteria options 222 that are available to the customer for creating criteria. Criteria options 222 include all the building blocks for creating criteria. Such building blocks include identifiers such as "SDDC version," "name," "tag," and "path." The building blocks also include operators such as "equals," "greater than," "contains," "one of," and "range." The building blocks also include conjunctions such as "and," "or," and "not." The customer selects such building blocks and inputs values to create criteria. For example, the customer may form the criteria "SDDC version>7.0" from the identifier "SDDC version," the operator "greater than," and the value "7.0." According to embodiments, the customer creates criteria such as: a required SDDC component type, a minimum or maximum SDDC version, a required SDDC tag, a required SDDC component tag, a required SDDC name/identifier, and a required SDDC component name/identifier.

Criteria processor 224 validates criteria to ensure that the criteria are semantically correct. Criteria processor 224 stores semantic rules 226, which are applied for performing such validation. For example, one of semantic rules 226 may be that SDDC versions must be decimals such as "7.0." If the customer then creates a criteria involving SDDC version such as "SDDC version=x3," criteria processor 224 determines that the criteria is invalid according to semantic rules 226. The customer is accordingly prompted with an error message.

AP appliance 112 includes various agents, including a configuration agent 270, discovery agents 272, an identity agent 274, and a coordinator agent 276. Identity agent 274 acquires access tokens from cloud authentication service 200 for other agents of AP appliance 112. Accordingly, identity agent 274 contains a client ID and client secret (not shown), which identity agent 274 includes in requests to cloud authentication service 200 for access tokens. Configuration agent 270 acquires access tokens from identity agent 274 to communicate with configuration service 210, e.g., to download desired state documents 218 for application to SDDCs.

Discovery agents 272 manage communications with respective management appliances. For example, one of discovery agents 272 manages communications with VM management appliances for all SDDCs 114. To manage such communications, discovery agents 272 store administrative credentials of respective management appliances for logging in to the management appliances and acquiring authentication tokens therefrom for other agents of AP appliance 112. To communicate with VM management appliances, configuration agent 270 acquires authentication tokens from one of discovery agents 272. Configuration agent 270 then uses the authentication tokens to invoke various APIs of VI profile services to manage the desired states of SDDCs.

Coordinator agent 276 installs the other agents of AP appliance 112 and manages the lifecycles thereof. In embodiments described herein, AP appliance 112 is one of hosts 240 or one of VMs 244. However, in other embodiments, AP appliance 112 may be implemented via other types of virtual computing instances such as containers, Docker® containers, data compute nodes, and isolated user space instances.

Figure 3:
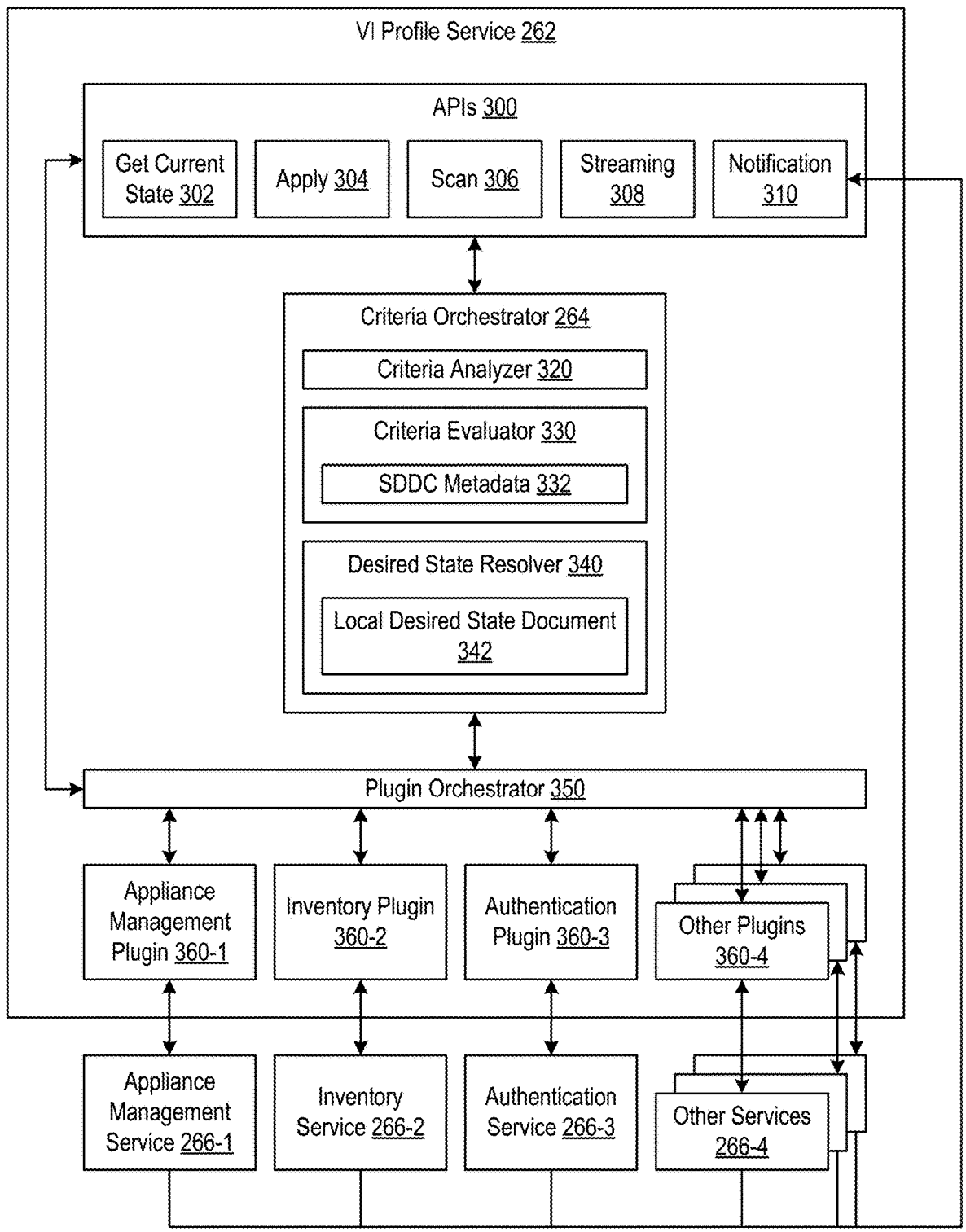
FIG. 3 is a block diagram of services of a VM management appliance, according to the first embodiment.

FIG. 3 is a block diagram of services of VM management appliance 260, according to the first embodiment. VM management appliance 260 includes an appliance management service 266-1, an inventory service 266-2, an authentication service 266-3, and other services 266-4. Appliance management service 266-1 provides system-level functionalities for VM management appliance 260 such as secure shell (SSH), network time protocol (NTP), resource utilization monitoring, network configuration, patching, and updating. Inventory service 266-2 creates and deletes hardware inventory items of SDDC 114-1 such as virtual compute, storage, and networking resources. Authentication service 266-3 performs role-based access to hosts 240 and VMs 244. Services 266 have corresponding plugins to VI profile service 262, including an appliance management plugin 360-1, an inventory plugin 360-2, an authentication plugin 360-3, and various other plugins 360-4. The plugins are registered with VI profile service 262 when VI profile service 262 is launched.

VI profile service 262 manages the configuration of services 266 based on a local desired state of SDDC 114-1. The local desired state, which is defined in a local desired state document 342, includes a desired state of services 266 and, by extension, the entirety of SDDC 114-1. As discussed further below, the local desired state is created by criteria orchestrator 264 from one of desired state documents 218. Desired states include configurations for services 266, the configurations being made up of attributes and associated values.

To manage the configurations of SDDC 114-1, VI profile service 262 exposes various APIs that are invoked by configuration agent 270 and by services 266. The APIs include a get-current-state API 302, an apply API 304, a scan API 306, a streaming API 308, and a notification API 310. Get-current-state API 302 is invoked by configuration agent 270 to obtain the current state of SDDC 114-1. Apply API 304 is invoked by configuration agent 270 to apply the local desired state of SDDC 114-1. Scan API 306 is invoked by configuration agent 270 to compute drift in the current state of SDDC 114-1 from the local desired state. Streaming API 308 is invoked by configuration agent 270 to obtain streaming updates, including any drift detected in the current state of SDDC 114-1 from the local desired state. Notification API 310 is invoked by services 266 to alert VI profile service 262 of changes in the configurations of services 266.

According to the first embodiment, VI profile service 262 includes criteria orchestrator 264, which analyzes configurations of a desired state defined in one of desired state documents 218. According to criteria therein, criteria orchestrator 264 generates a local desired state that includes configurations that are applicable to SDDC 114-1 and that excludes configurations that are not applicable. In particular, criteria orchestrator 264 includes a criteria analyzer component 320, a criteria evaluator component 330, and a desired state resolver component 340. Criteria analyzer 320 identifies operations to be evaluated according to various criteria. For example, an operation to be evaluated may be "SDDC version<8.0."

Criteria evaluator 330 checks SDDC metadata 332 to determine which components of SDDC 114-1 various configurations are applicable to. For example, SDDC metadata may indicate that the version of VM management appliance 260 (the SDDC version) is 8.1. In the above example of the operation "SDDC version<8.0," any associated configurations are inapplicable to components of SDDC 114-1. Desired state resolver 340 creates local desired state document 342 based on evaluations from criteria evaluator 330. In the above example, desired state resolver 340 excludes all the configurations associated with the criteria operation "SDDC version<8.0." As another example, a criteria may require a particular tag to be applied to a VM. In response to this criteria, desired state resolver 340 adds the associated configuration to local desired state document 342 along with a list of all VMs 244 that have the particular tag applied thereto.

VI profile service 262 includes a plugin orchestrator 350 through which configuration agent 270 communicates with plugins 360 via APIs 300 and through which criteria orchestrator 264 communicates with plugins 360. Configuration agent 270 communicates with plugin orchestrator 350, e.g., to obtain the current state of SDDC 114-1 via get-current-state API 302. Plugin orchestrator 350 then communicates with plugins 360 to obtain respective portions of the current state. Criteria orchestrator 264 communicates with plugin orchestrator 350 to apply the local desired state. Plugin orchestrator 350 then communicates respective portions of the local desired state to plugins 360.

For configuring settings of VM management appliance 260 such as enabling or disabling SSH, plugin orchestrator 350 provides configurations to appliance management plugin 360-1 to be applied to appliance management service 266-1. For configuring the hardware inventory of SDDC 114-1 such as specifying an amount of virtual compute resources for a cluster, plugin orchestrator 350 provides configurations to inventory plugin 360-2 to be applied to inventory service 266-2. For configuring authentication privileges of SDDC 114-1 such as creating a new role for performing operations on hosts 240, plugin orchestrator 350 provides configurations to authentication plugin 360-3 to be applied to authentication service 266-3. For configuring resources of a cluster that includes VM management appliance 260 (referred to herein as a "management cluster") such as specifying an amount of virtual compute resources to allocate to the management cluster, plugin orchestrator 350 provides configurations to one of other plugins 360-4 to be applied to one of other services 266-4. For configuring hosts 240 such as specifying keyboard layouts therefor, plugin orchestrator 350 provides configurations to another one of plugins 360-4 to be applied to another one of services 266-4.

Figure 4A:
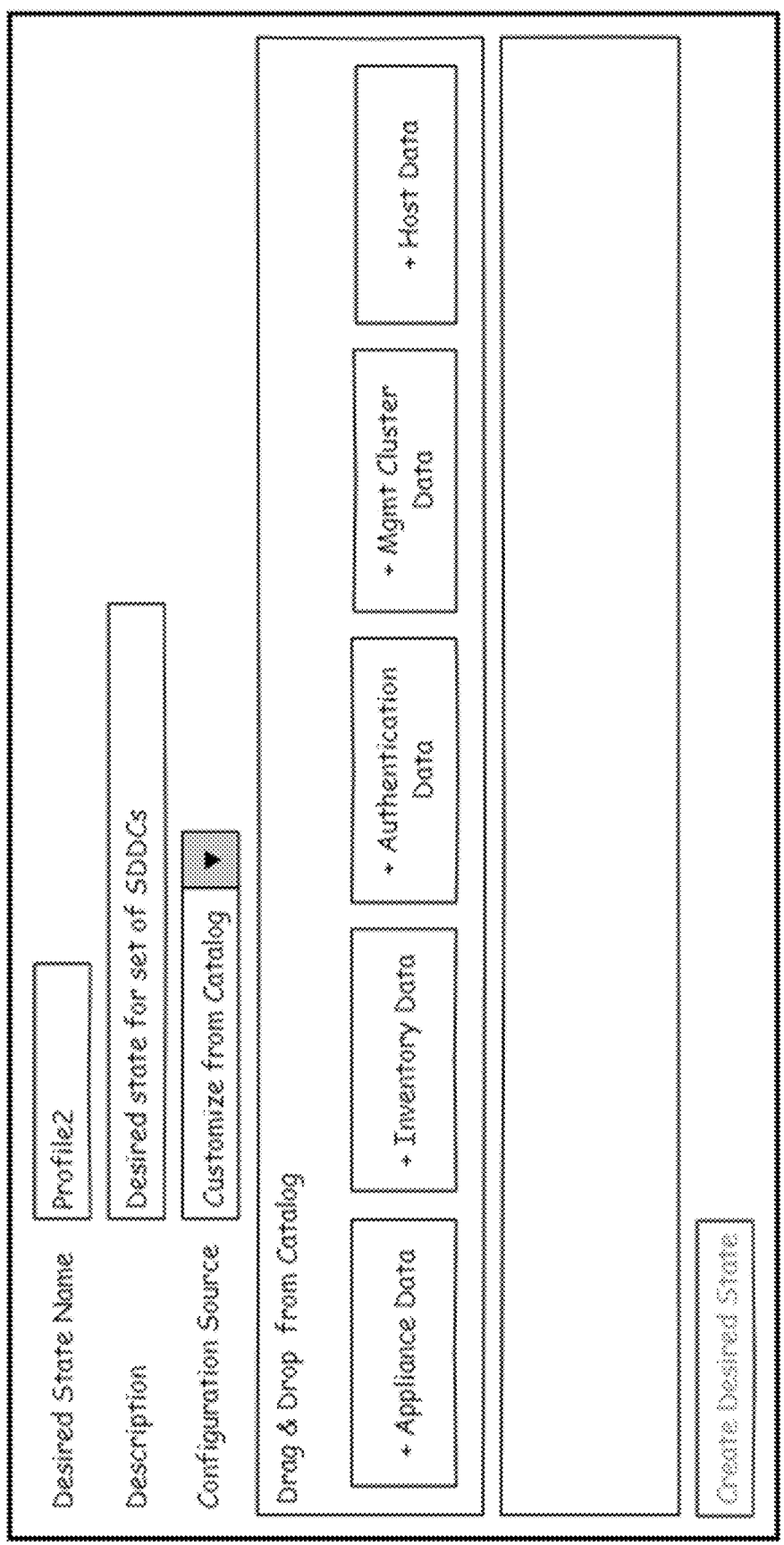
FIG. 4A is a block diagram illustrating an exemplary UI for creating a desired state document, according to embodiments.

FIG. 4A is a block diagram illustrating an exemplary UI of cloud platform 102 for creating one of desired state documents 218, according to embodiments. As illustrated, the customer is creating a desired state called "Profile2" for a set of SDDCs. There are five categories illustrated for selecting and adding configurations. However, according to embodiments, there may be any number of different categories.

The first category, labeled "Application Data," includes attributes of VM management appliance 260 to be configured through appliance management service 266-1. The second category, labeled "Inventory Data," includes attributes of hardware inventories of SDDCs to be configured through inventory service 266-2. The third category, labeled "Authentication Data," includes attributes for authentication privileges of SDDCs to be configured through authentication service 266-3. The fourth category, labeled "Mgmt Cluster Data," includes attributes of resources of management clusters to be configured through one of services 266-4. The fifth category, labeled "Host Data," includes attributes of hosts to be configured through another one of services 266-4.

Figure 4B:
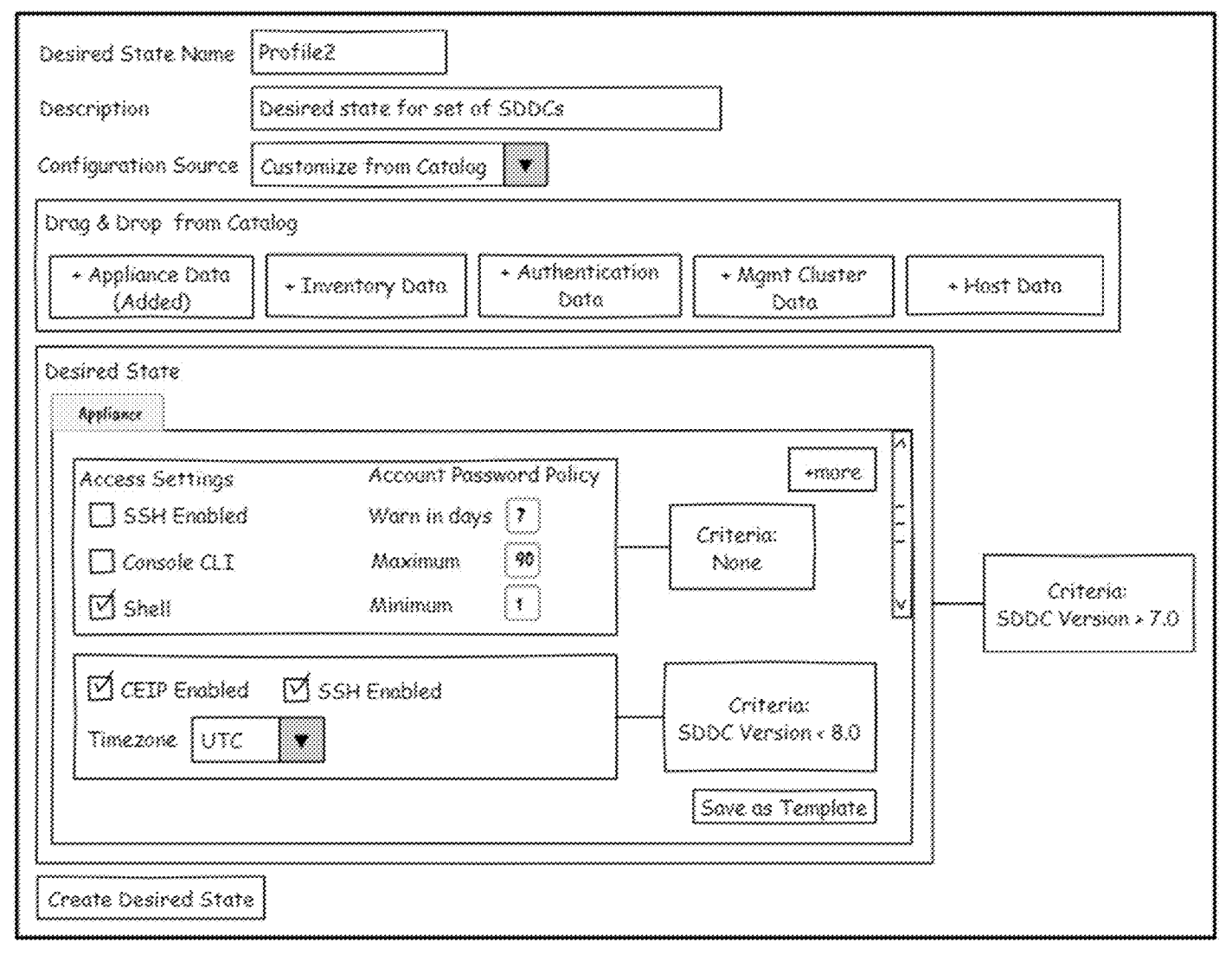

FIG. 4B is a block diagram illustrating an example of using the UI to specify management appliance setting configurations to be added to one of desired state documents 218. As illustrated in an "Access Settings" section, the customer has enabled a shell for interfacing with VM management appliances. As illustrated in an "Account Password Policy" section, the customer has specified configurations for a password to an account for accessing VM management appliances, including receiving a warning within 7 days of a password expiring, the password expiring 90 days after it is created, and the password being changeable 1 day after it is created. The criteria "SDDC Version>7.0" is associated with all the configurations in FIG. 4B, including those of the "Access Settings" and "Account Password Policy" sections. Accordingly, these configurations are only applicable to SDDCs in which a version of a VM management appliance is greater than 7.0.

As further illustrated in a bottom portion, a customer experience improvement program (CEIP) is enabled for collecting various data, SSH is enabled, and a time zone is set to Coordinated Universal Time (UTC). An additional criteria is set for the bottom portion, namely that "SDDC Version<8.0." Accordingly, for configurations of the bottom portion to be applicable to a VM management appliance, the version of the VM management appliance must be between 7.0 and 8.0. The customer may click a "Save as Template" button to save configurations for usage by others in completing one of desired state documents 218. Usage of templates may be useful, e.g., for administrators of the customer with varying expertise to collaborate by each creating a separate portion of a desired state. The customer may also click a "Create Desired State" button to save the configurations of FIG. 4B as one of desired state documents 218.

Figure 4C:
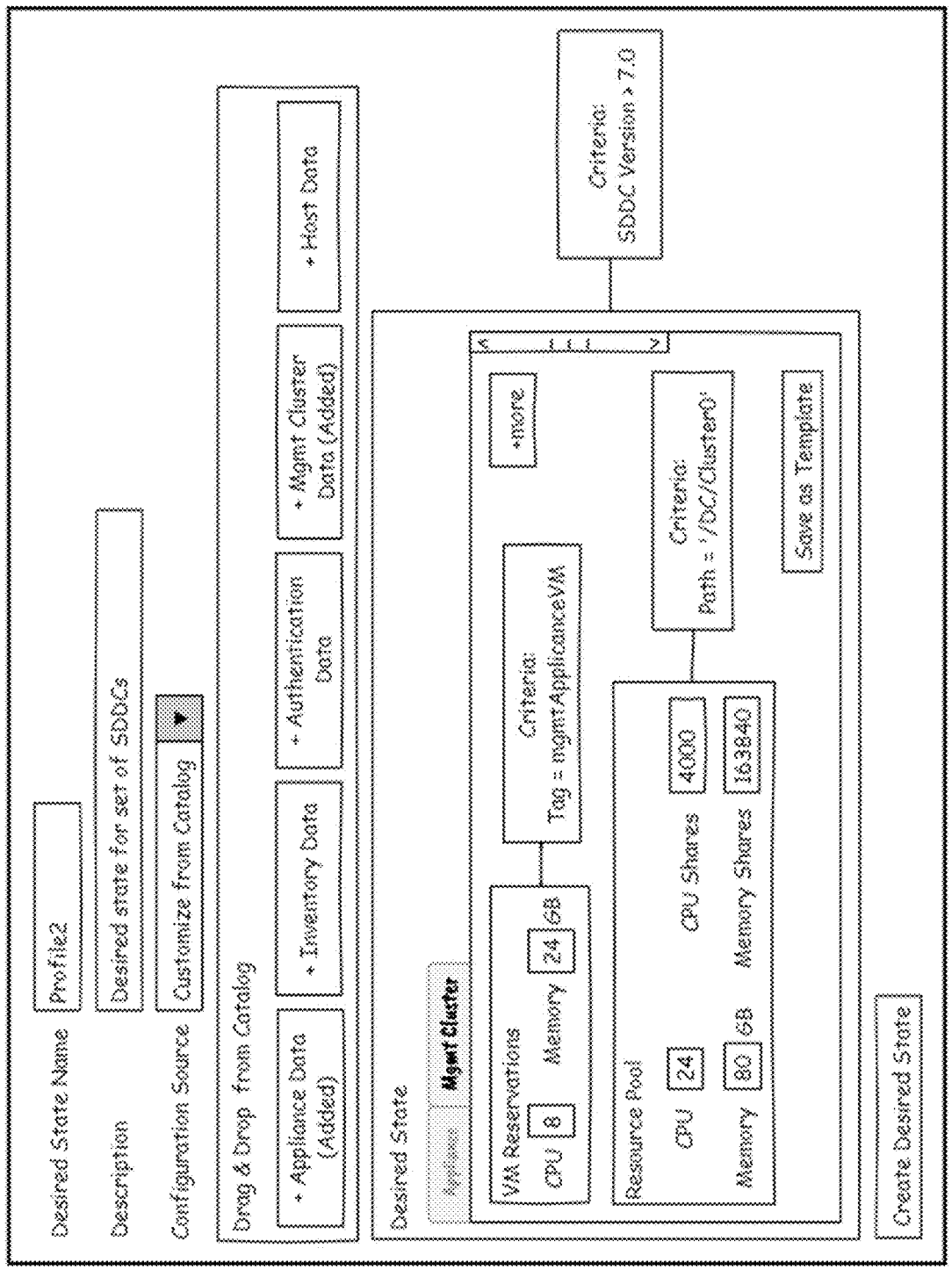
FIG. 4C is a block diagram illustrating an example of using the UI to specify management cluster resource configurations to be added to the desired state document.

FIG. 4C is a block diagram illustrating an example of using the UI to specify management cluster resource configurations to be added to one of desired state documents 218. As illustrated in a "VM Reservations" section, VMs are each provisioned 8 virtual CPUs (vCPUs) and 24 GB of virtual memory. Furthermore, there are two criteria associated with the configurations of the "VM Reservations" section, including "SDDC Version>7.0" and "Tag=mgmtApplianceVM." Accordingly, such criteria are only applicable in an SDDC in which a version of a VM management appliance is greater than 7.0. Furthermore, such criteria are only applicable to VMs that are tagged with the label "mgmtAppliance VM."

There is an additional "Resource Pool" section defining configurations for additional VMs, including configurations for provisioning vCPUs, provisioning virtual memory, provisioning vCPU shares, and provisioning virtual memory shares. There are two criteria associated with these configurations, including "SDDC Version>7.0" and "Path='/DC/Cluster0.'" Accordingly, such criteria are only applicable in an SDDC in which the version of the VM management appliance is greater than 7.0. Furthermore, such criteria are only applicable to a cluster that is accessible by the VM management appliance at the specified path.

Figure 5:
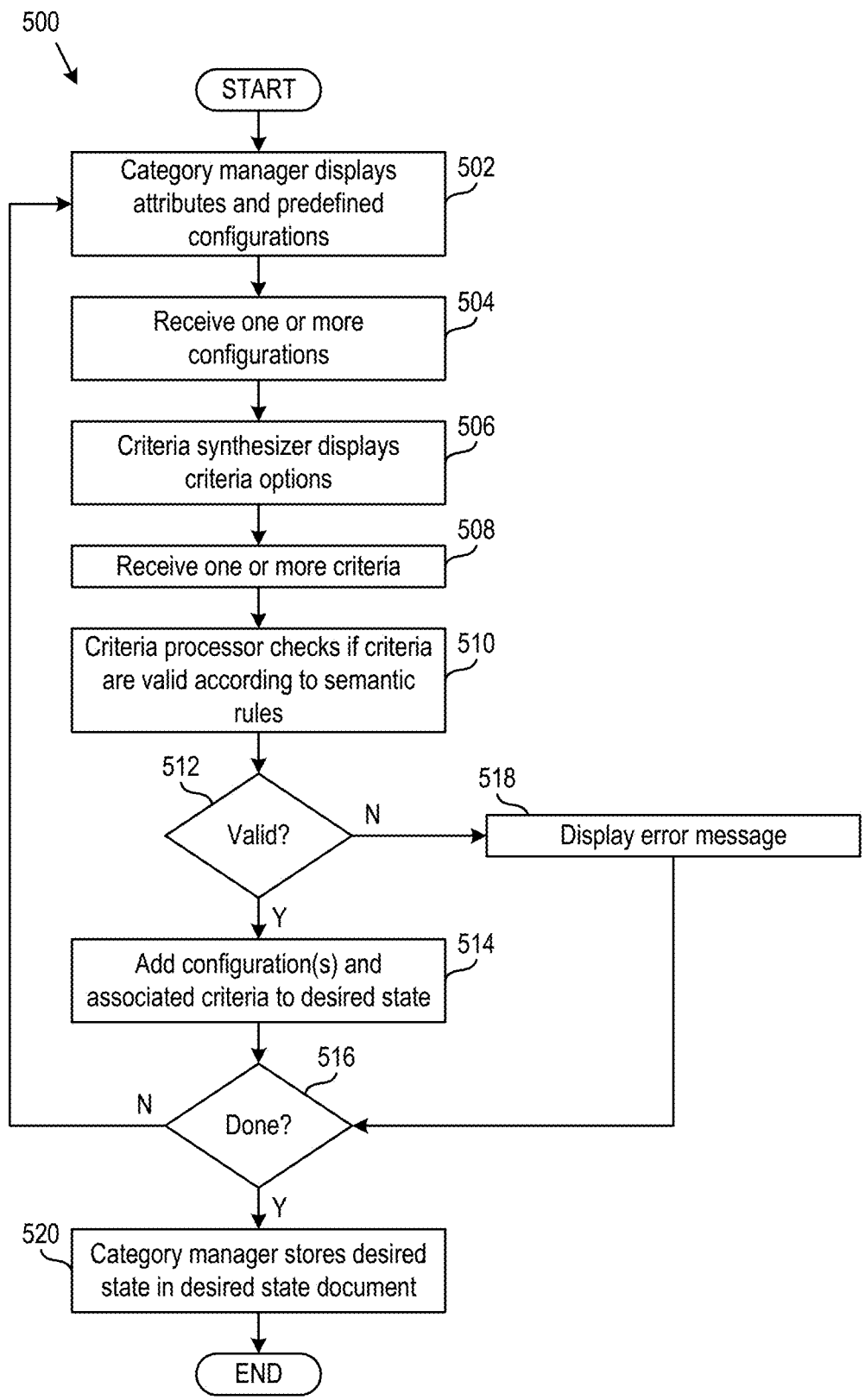
FIG. 5 is a flow diagram of a method performed by a configuration service of the cloud platform to create a desired state document, according to embodiments.

FIG. 5 is a flow diagram of a method 500 performed by configuration service 210 to create one of desired state documents 218, according to embodiments. At step 502, category manager 212 displays attributes from attributes list 214 to the customer via a UI of cloud platform 102. For some of the attributes, category manager 212 also displays predefined configurations from predefined configurations 216. At step 504, configuration service 210 receives one or more configurations from the customer via the UI, such configurations either being added by the customer or selected from predefined configurations 216.

At step 506, criteria synthesizer 220 displays criteria options 222 to the user via the UI of cloud platform 102. As previously mentioned, such options include identifiers such as "SDDC version," operators such as "equals." and conjunctions such as "and." At step 508, configuration service 210 receives one or more criteria to apply to the one or more configurations received at step 504 such as "SDDC version>7.0." At step 510, criteria processor 224 checks semantic rules 226 to determine if the criteria received at step 508 are valid.

At step 512, if the criteria are valid, i.e., do not violate any of semantic rules 226, method 500 moves to step 514. At step 514, configuration service 210 adds the configuration(s) and associated criteria received at steps 504 and 508 to the desired state. At step 516, if the customer is still entering configurations, i.e., the customer has not selected to create the desired state document, method 500 returns to step 502, and category manager 212 again displays attributes and predefined configurations. Returning to step 512, if criteria created by the customer are invalid, i.e., violate at least one of semantic rules 226, method 500 moves to step 518.

At step 518, configuration service 210 displays an error message to the customer via the UI of cloud platform 102 indicating the invalidity of the criteria. At step 516, if the customer has finished adding and selecting configurations, method 500 moves to step 520. At step 520, category manager 212 creates one of desired state documents 218 from all the configurations and associated criteria of the desired state and stores the new desired state document. After step 520, method 500 ends.

Figure 6:
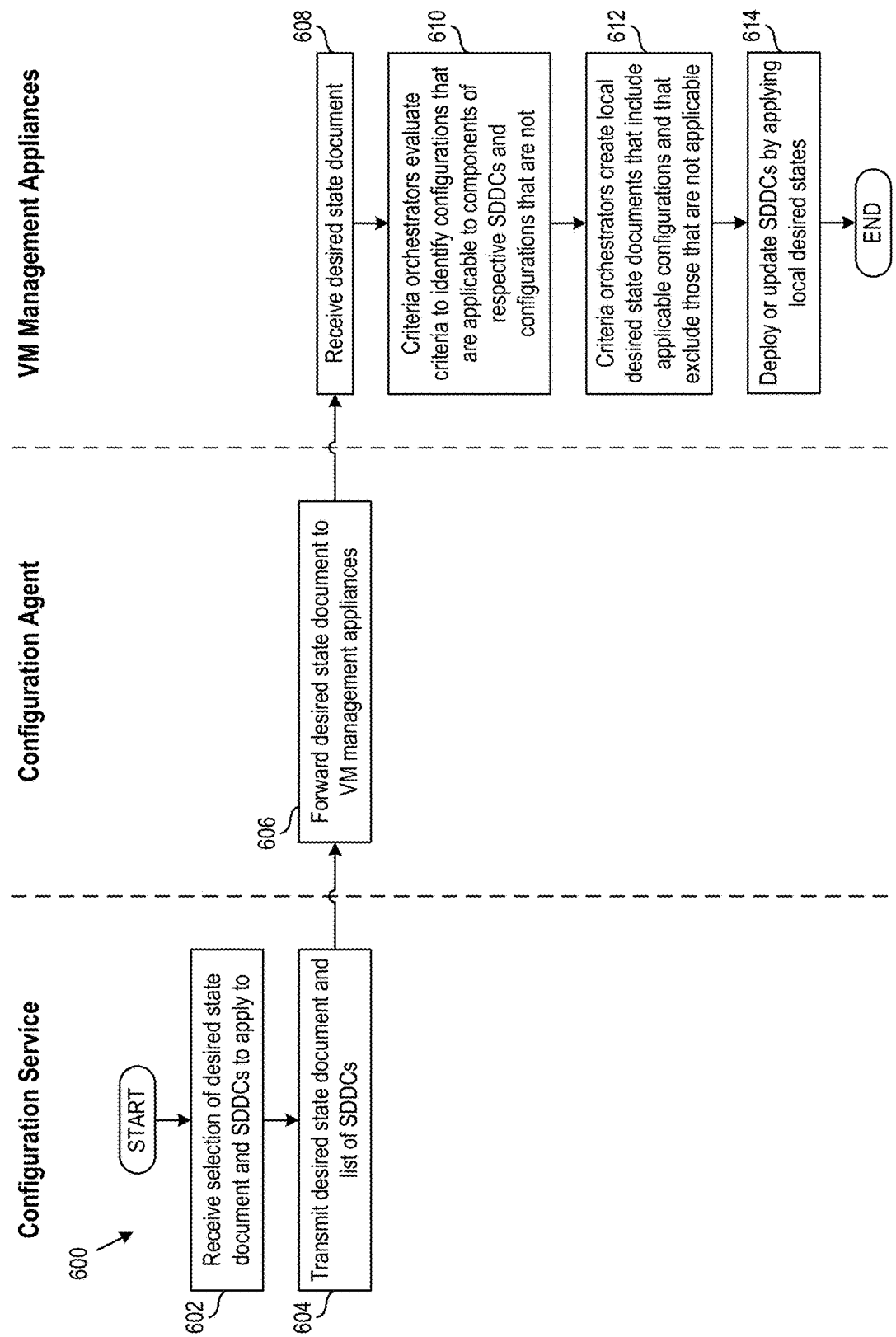
FIG. 6 is a flow diagram of a method performed by components of the public cloud and customer environment to deploy or update SDDCs, according to the first embodiment.

FIG. 6 is a flow diagram of a method 600 performed by configuration service 210 of cloud platform 102, configuration agent 270 of AP appliance 112, and VM management appliances of a plurality of SDDCs to deploy or update the SDDCs, according to the first embodiment in which criteria orchestrators are in VI profile services of VM management appliances. At step 602, configuration service 210 receives a selection from the customer of one of desired state documents 218 and a selection of which SDDCs to apply the desired state to. At step 604, configuration service 210 transmits the selected desired state document to configuration agent 270 along with a list of the selected SDDCs. At step 606, configuration agent 270 forwards the desired state document to VM management appliances of the selected SDDCs such as VM management appliance 260 of SDDC 114-1. In particular, configuration agent 270 invokes apply APIs of the VM management appliances.

At step 608, the VM management appliances receive copies of the selected desired state document. At step 610, the criteria orchestrators evaluate the criteria from the desired state document to identify configurations that are applicable to components of the respective SDDCs and configurations that are not applicable thereto. At step 612, the criteria orchestrators create local desired state documents that include those configurations that are applicable and that exclude those configurations that are not applicable. The evaluations of step 610 and creations of local desired state documents of step 612 are discussed further below in conjunction with FIG. 7. At step 614, the VM management appliances deploy the respective SDDCs (or update the respective SDDCs if already deployed) by applying the local desired states thereof.

In particular, criteria orchestrators of the respective VI profile services provide the local desired state configurations to plugin orchestrators. The plugin orchestrators then transmit portions of the local desired states to plugins of the VI profile services to be applied to respective services of the VM management appliances. For each plugin to apply desired state configurations to a respective service, the plugin first compares the desired state configurations to current configurations of the service. If the service has not yet been configured, all of the desired state configurations will be new. On the other hand, if the service is configured according to a previous local desired state document, only some of the desired state configurations may be different. For those desired state configurations that are new or different, the plugin makes an API call to the service to add the desired state configurations and/or to change current configurations to corresponding desired state configurations. Once the plugins of the VM management appliances apply the local desired states to the respective services, the services deploy or update the SDDCs according to the configurations of the local desired states. After step 614, method 600 ends.

Figure 7:
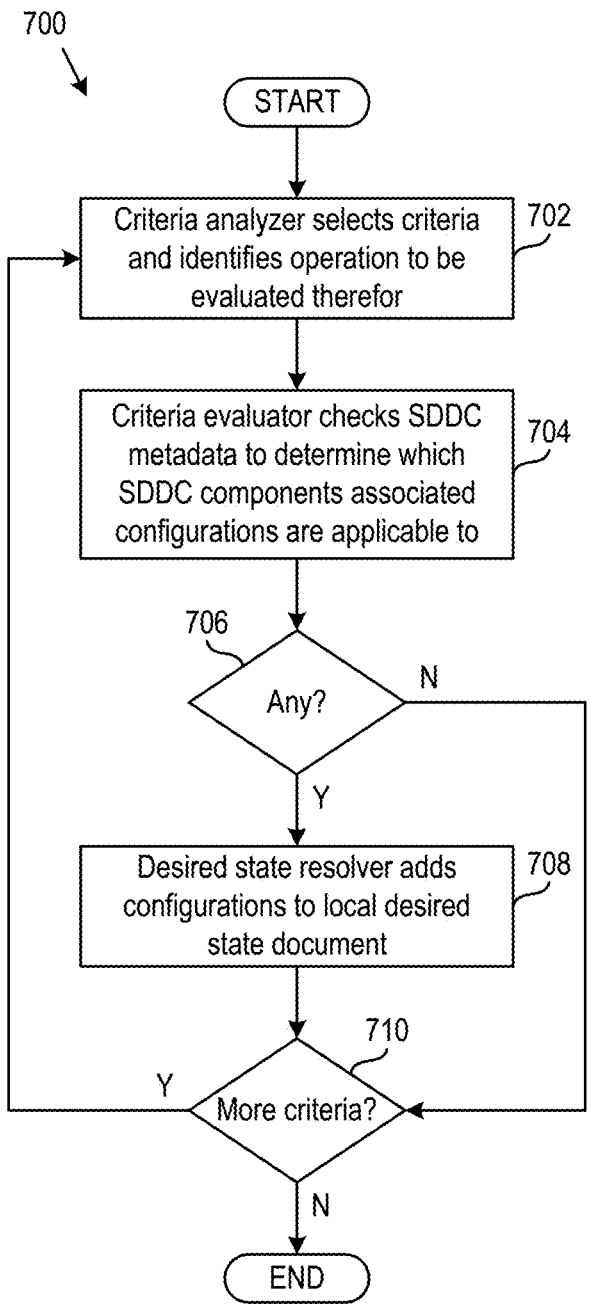
FIG. 7 is a flow diagram of a method performed by a criteria orchestrator of the customer environment to evaluate criteria and create a local desired state document, according to embodiments.

FIG. 7 is a flow diagram of a method 700 performed by a criteria orchestrator to evaluate criteria and create a local desired state document, according to embodiments. Method 700 will be discussed with reference to criteria orchestrator 264. At step 702, criteria analyzer 320 selects a criteria from one of desired state documents 218 and identifies an operation to be performed therefor such as "Tag=mgmtApplianceVM." At step 704, criteria evaluator 330 checks SDDC metadata 332 to determine which components of SDDC 114-1 the associated configurations are applicable to. In the above example, the associated configurations are applicable to any of VMs 244 to which the tag "mgmtApplianceVM" has been applied.

At step 706, if there is at least one SDDC component to which the associated configurations are applicable, method 700 moves to step 708. At step 708, desired state resolver 340 adds the associated configurations to local desired state document 342. Desired state resolver 340 also adds a list to local desired state document 342 of all the SDDC components that the configurations are applicable to. In the above example, the list includes identifiers of all of VMs 244 to which the tag has been applied. Returning to step 706, if the associated configurations are not applicable to any components of SDDC 114-1, method 700 moves directly to step 710, such configurations being excluded from local desired state document 342.

At step 710, if there is at least one more criteria to evaluate, method 700 returns to step 702, and criteria analyzer 320 selects the next criteria. Otherwise, if there are no more criteria to analyze (and no more configurations to add from the one of desired state documents 218), method 700 ends. It should be noted that there may be some configurations that do not have any associated criteria. For such configurations, desired state resolver 340 adds the associated configurations to local desired state document 342 along with a list of SDDC components that the configurations are applicable to, e.g., identifiers of all of VMs 244.

Figure 8:
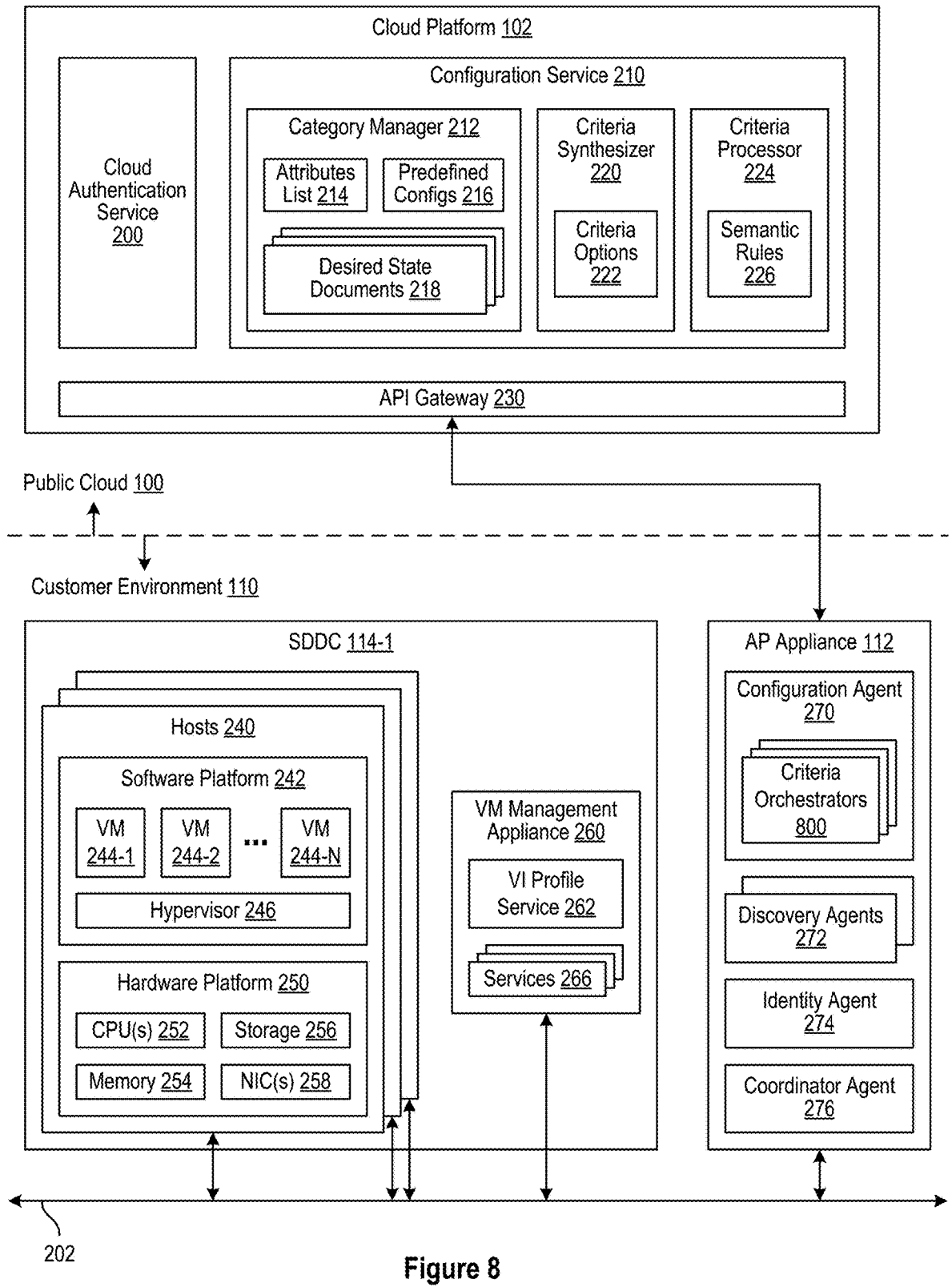
FIG. 8 is a block diagram of the public cloud and the single customer environment, according to a second embodiment.

FIG. 8 is a block diagram of public cloud 100 and customer environment 110, according to a second embodiment. In the second embodiment, instead of there being a single criteria orchestrator in each of the VM management appliances, there is a list of criteria orchestrator objects 800 in configuration agent 270 of AP appliance 112. Each of criteria orchestrators 800 includes its own criteria analyzer component, criteria evaluator component, and desired state resolver component, as illustrated in criteria orchestrator 264 in FIG. 3. Each of criteria orchestrators 800 corresponds to one of the VM management appliances. For example, one of criteria orchestrators 800 creates a local desired state document for VM management appliance 260. The criteria orchestrator then invokes apply API 304 and transmits the local desired state document to VI profile service 262 to be applied to services 266, i.e., to SDDC 114-1.

Figure 9:
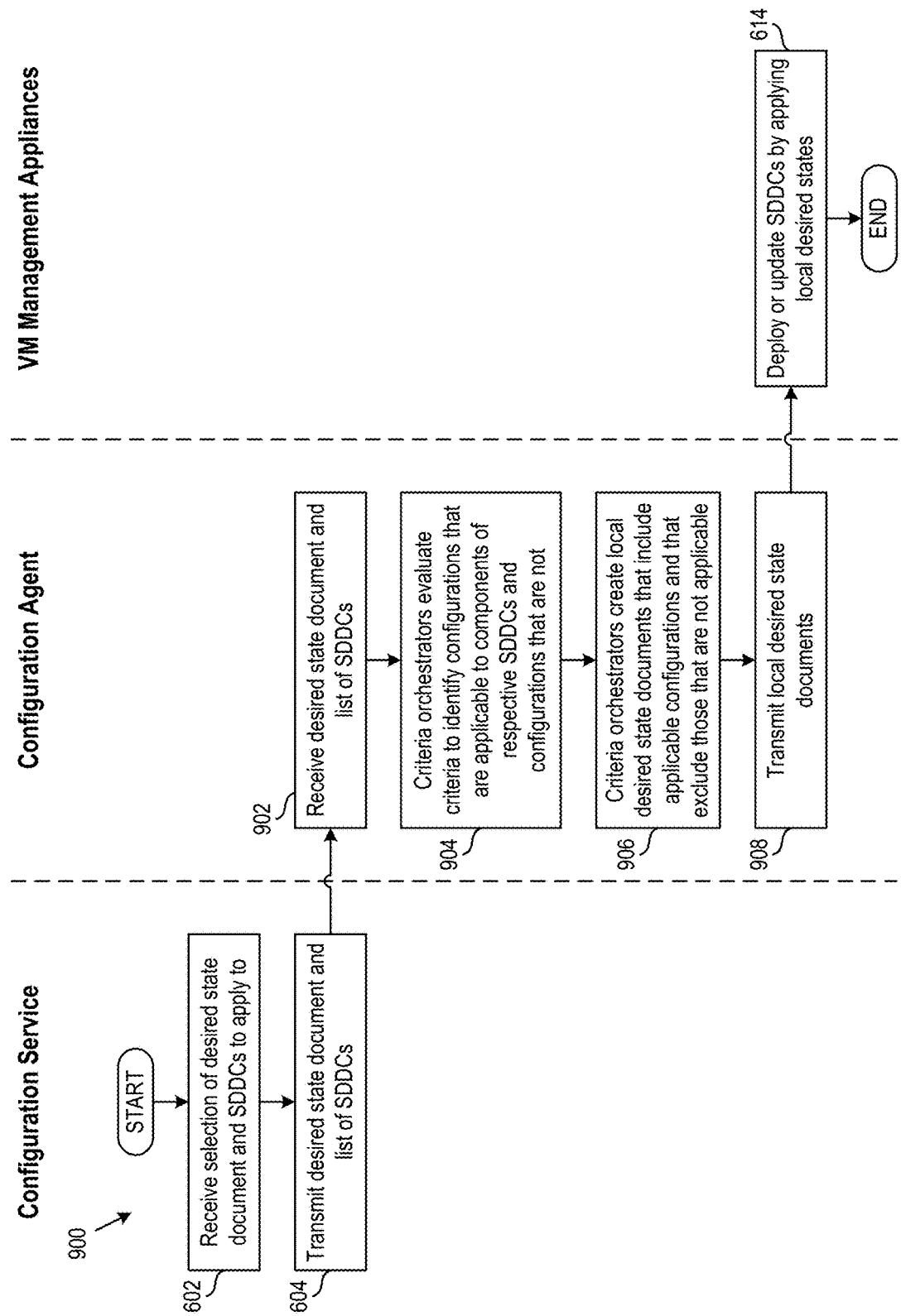
FIG. 9 is a flow diagram of a method performed by the components of the public cloud and customer environment to deploy or update SDDCs, according to the second embodiment.

FIG. 9 is a flow diagram of a method 900 performed by configuration service 210 of cloud platform 102, configuration agent 270 of AP appliance 112, and VM management appliances of a plurality of SDDCs to deploy or update the SDDCs, according to the second embodiment in which criteria orchestrators are in configuration agent 270. Steps that are common with FIG. 6 have the same numbers and will not be described again. At step 902, configuration agent 270 receives a selected desired state document and a list of selected SDDCs from configuration service 210. At steps 904 and 906, those of criteria orchestrators 800 corresponding to the selected SDDCs evaluate the criteria from the desired state document and create local desired state documents for respective SDDCs, as discussed above in conjunction with FIG. 7. At step 908, configuration agent 270 transmits the local desire state documents to respective VM management appliances for application to the SDDCs. In particular, configuration agent 270 invokes apply APIs of the respective VM management appliances. At step 614, the VM management appliances deploy or update the SDDCs, and method 900 ends.

The embodiments described herein may employ various computer-implemented operations involving data stored in computer systems. For example, these operations may require physical manipulation of physical quantities. Usually, though not necessarily, these quantities are electrical or magnetic signals that can be stored, transferred, combined, compared, or otherwise manipulated. Such manipulations are often referred to in terms such as producing, identifying, determining, or comparing. Any operations described herein that form part of one or more embodiments may be useful machine operations.

One or more embodiments of the invention also relate to a device or an apparatus for performing these operations. The apparatus may be specially constructed for required purposes, or the apparatus may be a general-purpose computer selectively activated or configured by a computer program stored in the computer. Various general-purpose machines may be used with computer programs written in accordance with the teachings herein, or it may be more convenient to construct a more specialized apparatus to perform the required operations. The embodiments described herein may also be practiced with computer system configurations including hand-held devices, microprocessor systems, microprocessor-based or programmable consumer electronics, minicomputers, mainframe computers, etc.

One or more embodiments of the present invention may be implemented as one or more computer programs or as one or more computer program modules embodied in computer-readable media. The term computer-readable medium refers to any data storage device that can store data that can thereafter be input into a computer system. Computer-readable media may be based on any existing or subsequently developed technology that embodies computer programs in a manner that enables a computer to read the programs. Examples of computer-readable media are magnetic drives, SSDs, network-attached storage (NAS) systems, read-only memory (ROM), RAM, compact disks (CDs), digital versatile disks (DVDs), magnetic tapes, and other optical and non-optical data storage devices. A computer-readable medium can also be distributed over a network-coupled computer system so that computer-readable code is stored and executed in a distributed fashion.

Although one or more embodiments of the present invention have been described in some detail for clarity of understanding, certain changes may be made within the scope of the claims. Accordingly, the described embodiments are to be considered as illustrative and not restrictive, and the scope of the claims is not to be limited to details given herein but may be modified within the scope and equivalents of the claims. In the claims, elements and steps do not imply any particular order of operation unless explicitly stated in the claims.

Virtualized systems in accordance with the various embodiments may be implemented as hosted embodiments, non-hosted embodiments, or as embodiments that blur distinctions between the two. Furthermore, various virtualization operations may be wholly or partially implemented in hardware. For example, a hardware implementation may employ a look-up table for modification of storage access requests to secure non-disk data. Many variations, additions, and improvements are possible, regardless of the degree of virtualization. The virtualization software can therefore include components of a host, console, or guest operating system (OS) that perform virtualization functions.

Boundaries between components, operations, and data stores are somewhat arbitrary, and particular operations are illustrated in the context of specific illustrative configurations. Other allocations of functionality are envisioned and may fall within the scope of the invention. In general, structures and functionalities presented as separate components in exemplary configurations may be implemented as a combined component. Similarly, structures and functionalities presented as a single component may be implemented as separate components. These and other variations, additions, and improvements may fall within the scope of the appended claims.

What is claimed is:

1. A method of managing desired states of a plurality of software-defined data centers (SDDCs) including a first SDDC and a second SDDC, the method comprising:

receiving, by each of a first management appliance of the first SDDC and a second management appliance of the second SDDC, an original desired state document that includes configurations and associated criteria for applying the configurations;

evaluating, by the first management appliance, a first criteria to determine that a first configuration associated with the first criteria is applicable to components of the first SDDC, and evaluating, by the second management appliance, the first criteria to determine that the first configuration is not applicable to any components of the second SDDC;

evaluating, by the second management appliance, a second criteria to determine that a second configuration associated with the second criteria is applicable to components of the second SDDC, and evaluating, by the first management appliance, the second criteria to determine that the second configuration is not applicable to any components of the first SDDC;

creating, by the first management appliance, a first updated desired state document for the first SDDC as a result of the evaluating of the first and second criteria by the first management appliance, and creating, by the second management appliance, a second updated desired state document for the second SDDC as a result of the evaluating of the first and second criteria by the second management appliance, the first updated desired state document including the first configuration and excluding the second configuration, and the second updated desired state document including the second configuration but excluding the first configuration; and applying, by the first management appliance, the first updated desired state document to the first SDDC and applying, by the second management appliance, the second updated desired state document to the second SDDC.

2. The method of claim 1, further comprising:

determining, by checking metadata about the first SDDC, components of the first SDDC to which the first configuration is applicable, wherein the first updated desired state document further includes identifiers of the components of the first SDDC to which the first configuration is applicable; and determining, by checking metadata about the second SDDC, components of the second SDDC to which the second configuration is applicable, wherein the second updated desired state document further includes identifiers of the components of the second SDDC to which the second configuration is applicable.

3. The method of claim 1, wherein the configurations in the original desired state document are categorized, and at least one of the configurations in the original desired state document is selected from a group of predefined configurations.

4. The method of claim 1, wherein components of the first SDDC to which the first configuration is applicable include a plurality of host computers or a plurality of virtual machines of the first SDDC, and components of the second SDDC to which the second configuration is applicable include a plurality of host computers or a plurality of virtual machines of the second SDDC.

5. The method of claim 1, wherein the first and second criteria each includes at least one of: (1) a required SDDC component type, (2) a minimum or maximum SDDC version, (3) a required SDDC tag or SDDC component tag, and (4) a required SDDC name/identifier or SDDC component name/identifier.

6. The method of claim 1, wherein the first and second configurations are each one of: (1) a configuration of management appliance settings, (2) a configuration of a hardware inventory of the first or second SDDC, and (3) a configuration of authentication privileges for the first or second SDDC.

7. A computer system comprising a plurality of host computers of a first software-defined data center (SDDC) and a plurality of host computers of a second software-defined data center (SDDC), wherein the host computers of the first and second SDDCs are configured to execute on processors of hardware platforms to:

receive, by each of a first management appliance of the host computers of the first SDDC and a second management appliance of the host computers of the second SDDC, an original desired state document that includes configurations and associated criteria for applying the configurations;

evaluate, by the first management appliance, a first criteria to determine that a first configuration associated with the first criteria is applicable to components of the first SDDC, and evaluate, by the second management appliance, the first criteria to determine that the first configuration is not applicable to any components of the second SDDC;

evaluate, by the second management appliance, a second criteria to determine that a second configuration associated with the second criteria is applicable to components of the second SDDC, and evaluate, by the first management appliance, the second criteria to determine that the second configuration is not applicable to any components of the first SDDC;

create, by the first management appliance, a first updated desired state document for the first SDDC as a result of the evaluating of the first and second criteria by the first management appliance, and create, by the second management appliance, a second updated desired state document for the second SDDC as a result of the evaluating of the first and second criteria by the second management appliance, the first updated desired state document including the first configuration and excluding the second configuration, and the second updated desired state document including the second configuration but excluding the first configuration; and apply, by the first management appliance, the first updated desired state document to the first SDDC and apply, by the second management appliance, the second updated desired state document to the second SDDC.

8. The computer system of claim 7, wherein the host computers of the first and second SDDCs are further configured to:

determine, by checking metadata about the first SDDC, components of the first SDDC to which the first configuration is applicable, the first updated desired state document further including identifiers of the components of the first SDDC to which the first configuration is applicable; and determine, by checking metadata about the second SDDC, components of the second SDDC to which the second configuration is applicable, the second updated desired state document further including identifiers of the components of the second SDDC to which the second configuration is applicable.

9. The computer system of claim 7, wherein the configurations in the original desired state document are categorized, and at least one of the configurations in the original desired state document is selected from a group of predefined configurations.

10. The computer system of claim 7, wherein components of the first SDDC to which the first configuration is applicable include a group of the host computers of the first SDDC or a plurality of virtual machines of the first SDDC, and components of the second SDDC to which the second configuration is applicable include a group of the host computers of the second SDDC or a plurality of virtual machines of the second SDDC.

11. The computer system of claim 7, wherein the first and second criteria each includes at least one of: (1) a required SDDC component type, (2) a minimum or maximum SDDC version, (3) a required SDDC tag or SDDC component tag, and (4) a required SDDC name/identifier or SDDC component name/identifier.

12. The computer system of claim 7, wherein the first and second configurations are each one of: (1) a configuration of management appliance settings, (2) a configuration of a hardware inventory of the first or second SDDC, and (3) a configuration of authentication privileges for the first or second SDDC.

* * * * *